(12) United States Patent
Morita

(10) Patent No.: US 7,986,393 B2
(45) Date of Patent: Jul. 26, 2011

(54) LIQUID CRYSTAL DISPLAY DEVICE

(75) Inventor: Shin Morita, Ishikawa-ken (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 251 days.

(21) Appl. No.: 12/405,078

(22) Filed: Mar. 16, 2009

(65) Prior Publication Data

US 2009/0231534 A1    Sep. 17, 2009

(30) Foreign Application Priority Data

Mar. 14, 2008  (JP) ................. 2008-066473

(51) Int. Cl.
  *G02F 1/1339*  (2006.01)
  *G02F 1/1343*  (2006.01)
(52) U.S. Cl. ........................... 349/153; 349/151
(58) Field of Classification Search .......... None
  See application file for complete search history.

(56) References Cited

U.S. PATENT DOCUMENTS

| | | | | |
|---|---|---|---|---|
| 6,731,369 | B2 * | 5/2004 | Choo ............ | 349/190 |
| 7,394,515 | B2 * | 7/2008 | Kwak et al. ........ | 349/151 |
| 2006/0139556 | A1 * | 6/2006 | Ahn et al. ......... | 349/153 |
| 2007/0139600 | A1 * | 6/2007 | Lee et al. ......... | 349/153 |

FOREIGN PATENT DOCUMENTS

| | | |
|---|---|---|
| JP | 11-052394 | 2/1999 |
| JP | 2004-272012 | 9/2004 |
| JP | 2006-126756 | 5/2006 |

OTHER PUBLICATIONS

Office Action issued Nov. 16, 2010 in Korean Application No. 10-2009-21733.

* cited by examiner

*Primary Examiner* — Tina M Wong
(74) *Attorney, Agent, or Firm* — Oblon, Spivak, McClelland, Maier & Neustadt, L.L.P.

(57) ABSTRACT

A liquid crystal display device includes an array substrate having a power supply line for supplying a power voltage to a counter electrode of a counter substrate. The power supply line connects a power pad arranged at a corner of the array substrate to a common line which is arranged between an active area and a seal portion, crossing the seal portion provided at a peripheral portion of the array substrate so as to surround the active area. The array substrate further includes at least two block elements with a convex shape for blocking the flowing out of the sealing element to the active area. The block elements are arranged so as to cross the power supply line and face the power supply pad. A gap between the block elements and the counter substrate is smaller than a gap between the slit formed by the adjacent block elements and the counter substrate.

19 Claims, 10 Drawing Sheets

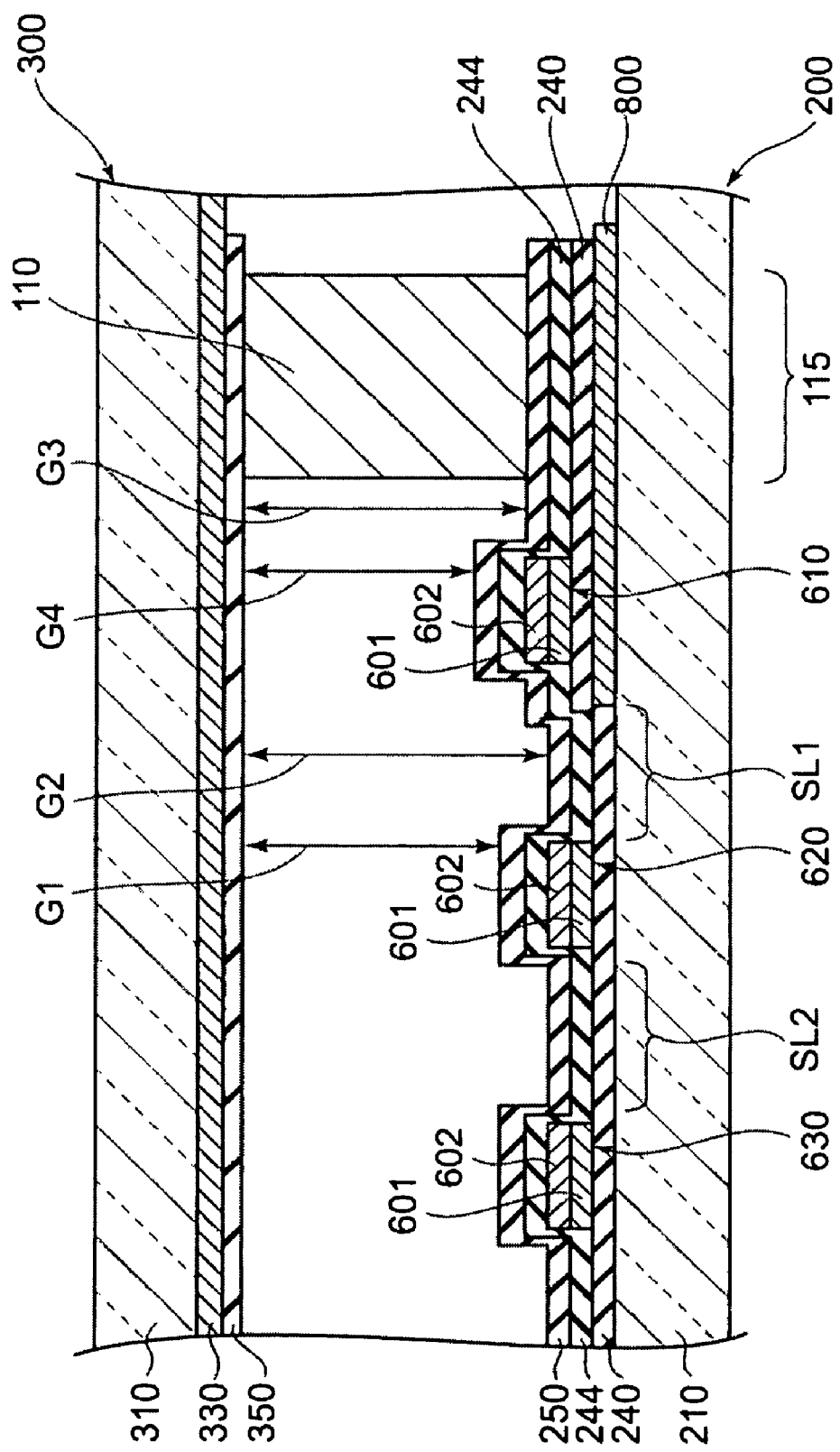

LIQUID CRYSTAL DISPLAY DEVICE

CROSS-REFERENCE TO RELATED APPLICATIONS

This application is based upon and claims the benefit of priority from prior Japanese Patent Application No. 2008-066473 filed Mar. 14, 2008 the entire contents of which are incorporated herein by reference.

BACKGROUND OF THE INVENTION

1. Field of the Invention

The present invention relates generally to a liquid crystal display device, and more particularly to a construction which prevents the flow of a seal element that attaches a pair of substrates to a pixel area.

2. Description of the Related Art

Liquid crystal display devices are widely used as display devices for various kinds of equipment such as personal computers, OA equipments, and TV sets because the display devices have many advantages such as lightness, compactness and low power consumption. In recent years, the liquid crystal display device is also used in a mobile terminal equipment such as a mobile phone, a car navigation device and a game player.

A liquid crystal display device includes a liquid crystal display panel having a liquid crystal layer sandwiched between an array substrate and a counter substrate with a seal element. The liquid crystal display panel includes a rectangular shaped active area for displaying an image, which is surrounded by the seal element.

In such a liquid crystal display device, the seal element flows out to the active area when the array substrate and the counter substrate are attached with the seal element. In particular, the seal element tends to flow along a small gap area between the opposed substrates by a capillary action. A wiring drawn out of the active area crosses the seal element so that the seal element tends to spread by flowing on the wiring located at the small gap area. The flowing out seal element may result in a display defect.

Though it is thought to make a gap between the active area and the seal element larger, such an approach runs counter to the current requirement for a small outside dimension. In order to solve this problem, Japan Laid Open Patent application 2006-126756 discloses a technology in which a wall shaped spacer is provided at a way point of the wiring layer so as to cross the wiring layer which is drawn out of a pixel area. Further, the above patent application discloses a technology in which the drawn out wiring layer is provided with a crank area to weaken the flowing strength of the seal element, and a scraped region with a belt shape is provided on a color filter layer formed on the counter substrate corresponding to the wiring layer to suppress the spread of the seal element by making the gap between the substrates large.

On the other hand, Japan Laid Open Patent Application 1999-52394 discloses a technology addressed to a problem when a light curing resin is used as the seal element. In the technology, incomplete hardening is caused due to shadowing of ultraviolet light, which is necessary to harden the seal element provided at the intersection with the wiring layer, by the wiring. Some slits are formed in the wiring layer at the overlapped portions with the seal element.

In the recent liquid crystal display device, the gap between the array substrate and the counter substrate becomes smaller and smaller so as to achieve a short response time and a wide view angle, which results in such construction that the seal element tends to flow easily. Further, the active area is arranged relatively close to the seal element to meet the requirement for narrow frame so as to make the outside dimension small.

As shown in the Japan Laid Open Patent Application 2006-126756, a dam shaped spacer formed simultaneously with a columnar spacer by using a light curing resign, has generally a taper shape in cross section and the area of a base side of the spacer where the spacer is formed is larger than that of a tip side. Therefore a larger area, which prevents obtaining a narrow frame, is needed to provide the dam shaped spacer. Further, since the dam shaped spacer has a height such that the spacer almost contacts to the counter substrate, the dam shaped spacer becomes a bar to injection of a liquid crystal material.

The seal element is applied so as to surround the active area. In the process for applying the seal element, the applying speed is lowered at the corner of the liquid crystal display panel, which results in an accumulation of the seal element. A power supply line of the array substrate is connected to a common electrode on the counter substrate through a conductive element at the corner of the liquid crystal display panel. The power supply line crosses the seal element and extends to the space between the active area and the seal element. Since the power supply line has a relatively larger width than that of a gate line or a source line, the accumulated seal element tends to flow into the active area along the power supply line.

BRIEF SUMMARY OF THE INVENTION

The present invention has been made to address the above mentioned problems.

According to a first aspect of the invention, there is provided a liquid crystal display device including a liquid crystal display panel having an active area for displaying pictures, the active area having pixels arranged in a matrix shape; a first substrate including picture electrodes of the pixels; a second substrate having a common electrode facing the picture electrodes; a seal element arranged in a seal portion surrounding the active area for attaching the first substrate and the second substrate; and a liquid crystal layer held between the couple of substrates, wherein the first substrate further comprises a power supply pad arranged at a corner of the active area facing to the common electrode, a common line arranged between the active area and the seal portion for supplying a common voltage, a connection line for connecting the power supply pad to the common line crossing to the seal portion, a block member of a convex shape having first and second block elements forming a slit and arranged opposite to the seal element between the active area and the seal portion crossing the connection line, and wherein a gap between the first and the second block elements and the second substrate is smaller than a gap between the slit formed by the first and second block elements and the second substrate on the connection line.

According to another aspect of the invention, there is provided a liquid crystal display device including a liquid crystal display panel having an active area for displaying pictures, the active area having pixels arranged in matrix shape; a first substrate including picture electrodes of the pixels; a second substrate having a common electrode facing the picture electrodes; a seal element arranged in a seal portion so as to surround the active area and so as to attach the first substrate to the second substrate; and a liquid crystal layer held between the first and second substrates, wherein the first substrate further comprises a power supply pad arranged at a corner of the active area facing the common electrode, a common line arranged between the active area and the seal portion, for supplying a common voltage and a connection line for connecting the power supply pad to the common line crossing the seal portion, and wherein the connection line has a serpentine shape including a plurality of line portions arranged in parallel with each other, and a gap between the line portions and the second substrate is smaller than a gap between the slit formed by adjacent of the line portions and the second substrate on the connection line.

According to other aspect of the invention, there is provided a liquid crystal display device including a liquid crystal display panel having an active area for displaying pictures, the active area having pixels arranged in matrix shape; a first substrate including picture electrodes of the pixels; a second substrate having a common electrode facing the picture electrodes; a seal element arranged in a seal portion so as to surround the active area and so as to attach the first substrate to the second substrate; and a liquid crystal layer held between the first and second substrates, wherein the first substrate further comprises a power supply pad arranged at a corner of the active area facing the common electrode, a power supply line formed at a peripheral portion of the liquid crystal display panel facing the active area, wherein the seal element is formed at the seal portion on the power supply line and a block member having a first and a second block elements arranged in parallel with the seal element is formed between the active area and the seal portion, and wherein the first block element is formed on the power supply line along to the sealing element and a slit is formed between the first block element and the second block element adjacent to the active area, in which a gap between the first block element and the counter substrate is smaller than a gap between a slit and the counter substrate.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a cross-sectional view showing the construction of the liquid crystal display panel and a power supply portion shown in FIG. 9 taken along line XI-XI.

DETAILED DESCRIPTION OF THE INVENTION

A display device according to an exemplary embodiment of the present invention, in particular, a liquid crystal display device, will now be described with reference to the accompanying drawings.

Figure 1:
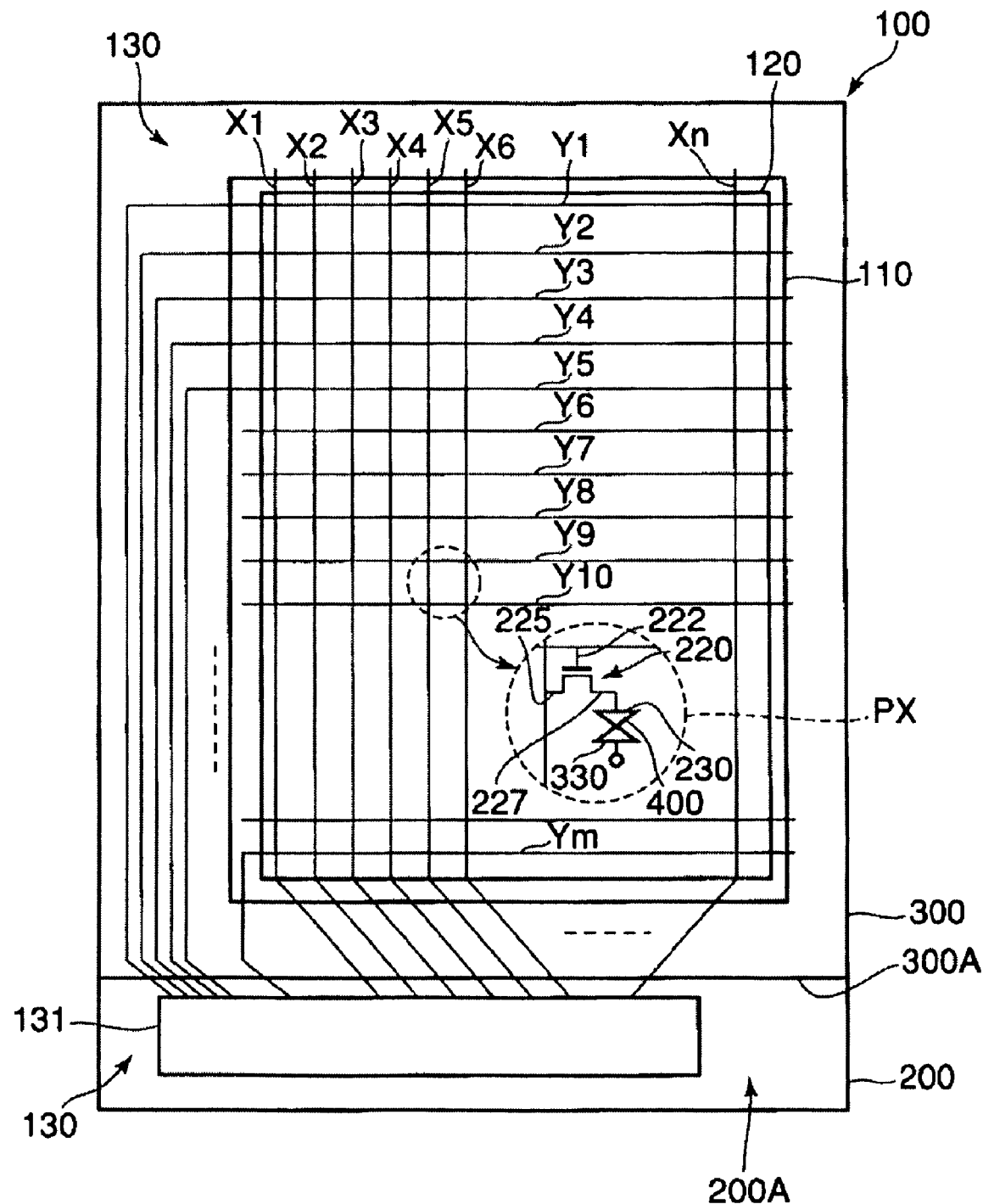
FIG. 1 is a diagram showing schematically a structure of a liquid crystal display device according to a first embodiment of the present invention.
Figure 2:
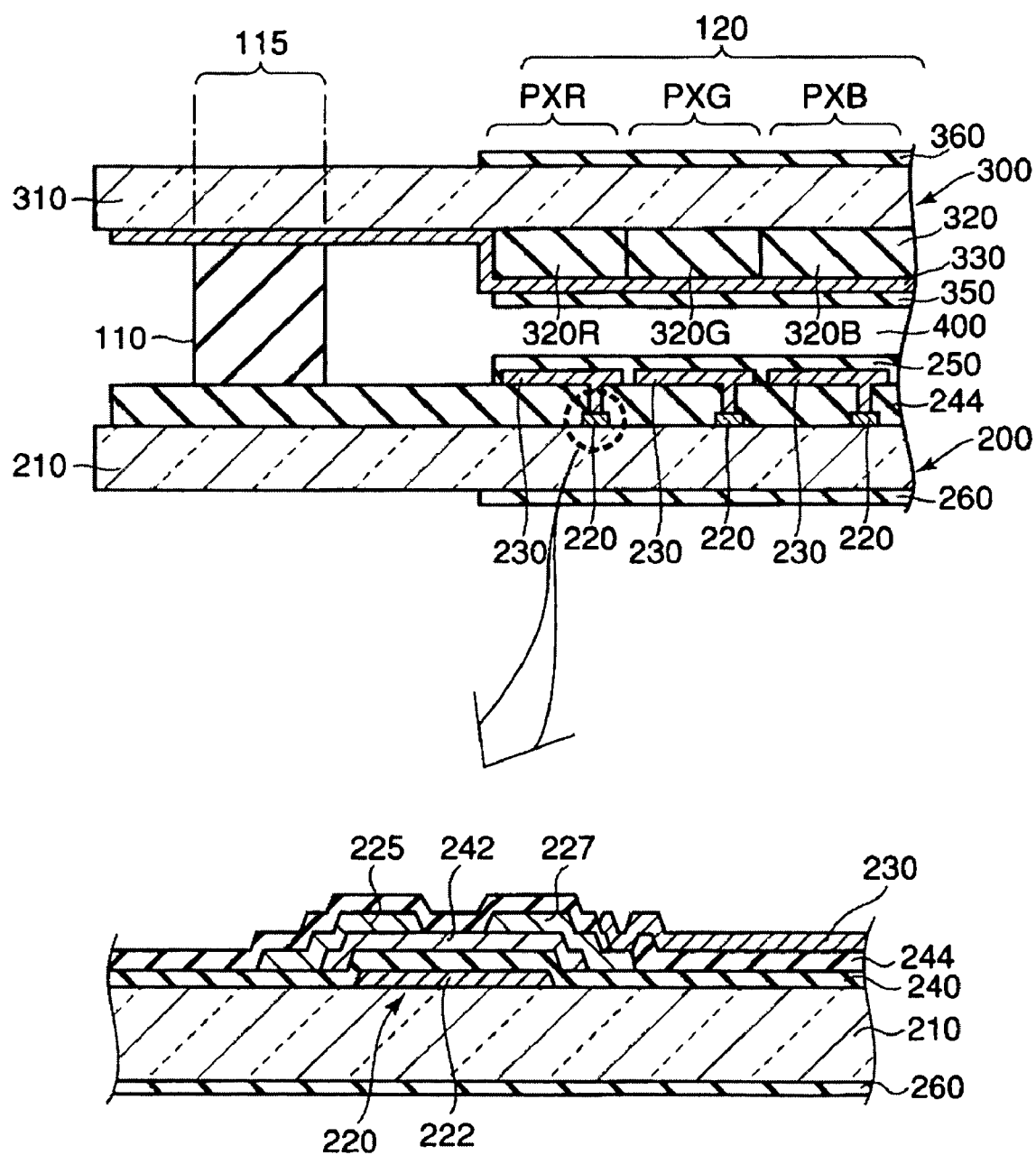
FIG. 2 is a cross-sectional view showing schematically the structure of a liquid crystal display panel shown in FIG. 1.

As shown in FIGS. 1 and 2, a liquid crystal display device includes an approximately rectangular-shaped flat liquid crystal display panel 100. The liquid crystal display panel 100 has a pair of substrates, which are an array substrate 200 (first substrate) and a counter substrate 300 (second substrate), sandwiching a liquid crystal layer 400 which functions as a light modulation layer therebetween. The array substrate 200 and the counter substrate 300 are attached by a seal element 110. The liquid crystal display panel 100 includes an approximately rectangular shaped active area 120 to display pictures surrounded by the seal element 110. The active area 120 consists of a plurality of pixels PX arranged in a matrix state. The array substrate 200 includes, in the active area 120, a plurality of gate lines Y (1, 2, 3, . . . , m) which extend in a row direction of the pixels PX, a plurality of source lines X (1, 2, 3, . . . , n) which extend in a column direction of the pixels PX crossing the gate lines Y such as to interpose a dielectric layer therebetween and switching elements 220 which are disposed near the intersections of the gate lines Y and the source lines X. Pixel electrodes 230 are connected to the associated switching elements 220. The switching elements 220 are formed by Thin Film Transistors (TFTs) which include a semiconductor layer made of amorphous or polysilicon. A gate electrode 222 of the switching elements 220 is electrically connected to the corresponding gate lines Y. A source electrode 225 of the switching elements 220 is connected to the corresponding source lines X or integrally formed with the source lines X. A drain electrode 227 of the switching elements 220 is connected to the pixel electrodes 230 of the pixels PX.

The counter substrate 300 includes a counter electrode 330 which is commonly disposed on the counter substrate 300 for all pixels PX. Furthermore, the liquid crystal display panel 100 includes a connection area 131 that is disposed at an outer periphery portion 130 arranged outside of the active area 120. The connection area 131 may be coupled to driver IC chips which function as signal sources, or a flexible wiring board. In the example shown in FIG. 1, the connection area 131 is disposed on an extending portion 200A of the array substrate 200 which extends outside from an edge 300A of the counter substrate 300. The respective gate line Y (1, 2, 3, . . . , m) is coupled to the connection area 131 via the outer periphery portion 130. Similarly, the respective source line X (1, 2, 3, . . . , n) is coupled to the connection area 131 via the outer periphery portion 130.

Next, the constructions of the array substrate 200 and the counter substrate 300 are respectively explained in detail.

As shown in FIG. 2, the array substrate 200 is formed using an insulated substrate 210 having a light transmissive characteristic, for example a glass. The gate electrode 222 of the switching element 220 is arranged on the substrate 210 with the gate line Y and the like. The gate electrode 222 is covered with a gate insulating layer 240, for example, made of a silicon nitride film (Si3 N4). The semiconductor layer 242 of the switching element 220 is formed on the gate insulating layer 240. The source electrode 225 and the drain electrode 227 of the switching element 220 are connected to the semiconductor layer 242. The source electrode 225 and drain electrode 227 are covered with a passivation film 244 like a silicon nitride film ($Si_3N_4$). A pixel electrode 230 is formed on the passivation film 244 for each pixel PX. The pixel electrode 230 is connected to the drain electrode through a contact hole formed in the passivation film 244.

In the transmissive type liquid crystal display device which displays an image by transmitting light from a backlight unit, the pixel electrodes 230 are made of a light transmissive conductive material, for example an indium tin oxide (ITO), an indium zinc oxide (IZO) and the like. On the other hand, the pixel electrodes 230 are made of a light reflective conductive material, for example, an aluminum (Al), a molybdenum (Mo) and the like, for use in a reflective liquid crystal display panel which displays an image by reflecting light.

In a color liquid crystal display device, a liquid crystal display panel 100 includes a plurality of pixels PX that are red color pixels PXR, green color pixels PXG, and blue color pixels PXB.

In an embodiment as shown in FIG. 2, the counter substrate 300 includes a color filter layer 320 (R, G, B) in the active area, which is formed on one surface of the insulating substrate 310 facing a respective pixel PX.

The color filter layer 320 includes a red color filter 320 R, a green color filter 320 G and a blue color filter 320 B made of colored resin, respectively. The color filter layer 320 can be disposed on the side of the array substrate 200 in the active area 120. The counter electrode 330 is formed on the color filter layer 320 facing to the pixels PX. The counter electrode 330 is made of a conductive material such as ITO and IZO with a light transmissive characteristics.

The surfaces of the array substrate 200 and the counter substrate 300 are covered with alignment films 250 and 350, respectively, for controlling the alignment of the liquid crystal molecules. For use in a transmissive liquid crystal display panel, an optical element 260 is provided outside the array substrate 200, and an optical element 360 is provided outside of the counter substrate 300. That is, the optical elements 260 and 360 are provided on the opposite sides of the liquid crystal layer 400. The optical elements 260 and 360 include polarizers in which a polarization direction thereof is matched to a characteristic of the liquid crystal layer 400.

As shown in FIG. 1, the seal element 110 is arranged between the array substrate 200 and the counter substrate 300 so as to surround the approximately rectangular active area 120. The seal element 110, for example, made of a resin such as a thermosetting resin and an ultraviolet curable resin is applied to the seal portion 115 on one of the substrates that form a liquid crystal display panel, for example, the array substrate 200. Next, another substrate, e.g. the counter substrate 300 is arranged on the array substrate 200 having the seal element 110. Then a pressure is applied to the pair of substrates while the pair of substrates are heated or irradiated by ultraviolet light. According to this process, the seal element 110 is hardened and the array substrate 200 and the counter substrate 300 are attached.

A power supply construction from the array substrate 200 to the counter substrate 330 will be described in detail below.

Figure 3:
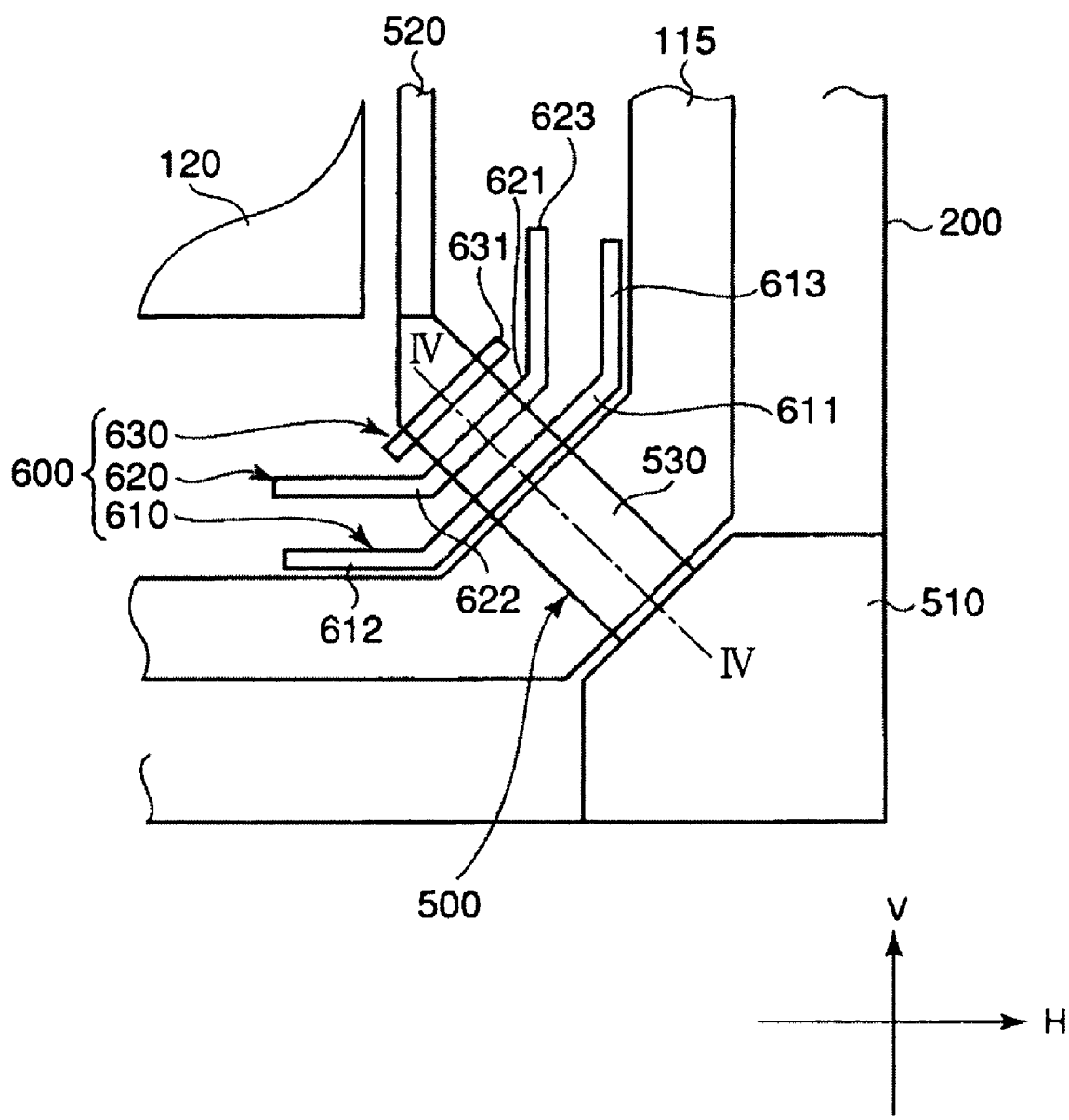
FIG. 3 is a diagram showing the constructions for power supply and for suppressing a spread of a seal element according to the first embodiment of the invention.
Figure 4:
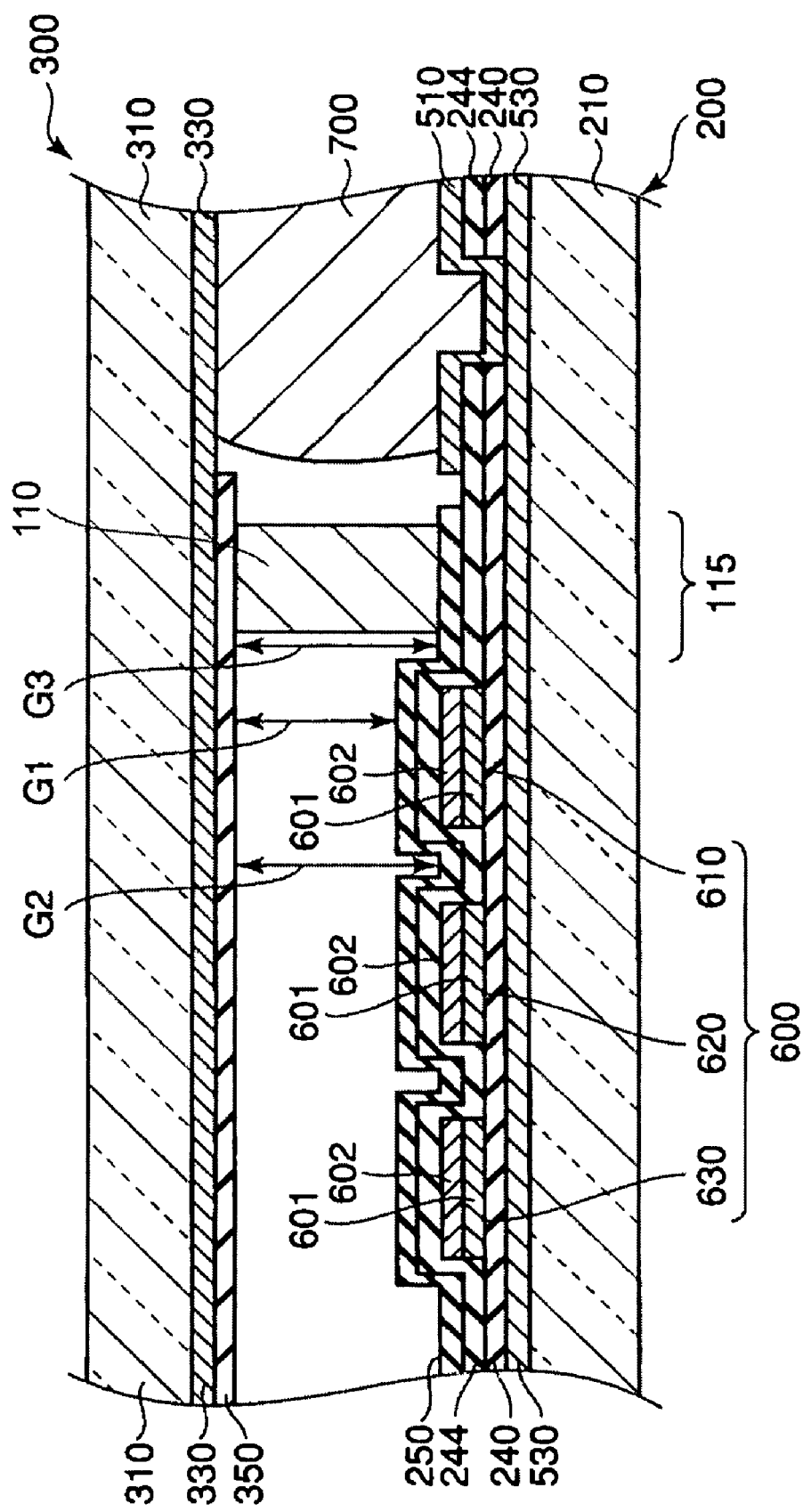
FIG. 4 is a cross-sectional view showing the constructions of the liquid crystal display panel and a power supply portion shown in FIG. 3 taken along line IV-IV.

As shown in FIGS. 3 and 4, the array substrate 200 includes a power supply line 500 for supplying a voltage, for example, a common voltage to the common electrode 330 formed on the counter substrate 300. The power supply line 500 includes a power supply pad 510, a common line 520 and a connection line 530. The power supply pad 510 is formed at the corner of the array substrate 200 in which the power supply pad 510 is closer to the edge of the array substrate 200 than the seal portion 115 where the seal element 110 is formed. The power supply pad 510 faces the counter electrode 330 that extends to the edge of the counter substrate 300 beyond the seal portion 115. The power supply pad 510, for example, made of the same material as the pixel electrode 230, is formed on the passivation film 244. The alignment layer 250 is not formed on the power supply pad 510.

The common line 520 is arranged in the space between the seal portion 115 and the active area 120. The common line 520 has set a voltage, for example, a common voltage by connection to a signal source through the connection area 131.

The connection line 530 crosses the seal portion 115 to connect the power supply pad 510 with the common line 520. The connection line 530 is made of the same material as the gate line Y and formed on an insulating substrate 210. The connection line 530 crosses the seal portion 115 extending to the edge side of the array substrate 200 and is connected to the power supply pad 510 through a contact hole formed in a double layers of a gate insulating layer 240 and the passivation film 244. The connection line 530 extends to inside of the seal portion 115 (e.g. active area side) and is connected to the common line 520 or integrally formed with the common line 520. A conductive element 700 is formed on the power supply pad 510 so as to connect the power supply line 500 to the counter electrode 330 of the counter substrate 300.

In the seal portion 115, the gap between the array substrate 200 and counter substrate 300 in the crossing area where the seal portion 115 crosses with the connection line 530 is smaller than other portions of the seal portion, because the thickness of the layer of the connection line 530 decreases the gap between the substrates relative to the other portions of the seal portion. In the crossing area, the layer of connection line 530, the gate insulating layer 240 and the passivation film 244 are stacked on the insulating substrate 210 while double layers of the gate insulating layer 240 and the passivation film 244 are formed on the insulating substrate 210 in the other portions of the seal portion where the seal portion 115 does not cross with the connection line 530.

The seal element 110 is applied at the seal portion 115 so as to surround the active area 120. In the process for applying the seal element 110, the applying speed is lowered at the corner of the array substrate 200 where the seal element 110 crosses the connection line 530 relative to other straight-line portions, which results in an accumulation of the seal element 110 at the corner of the array substrate 200. The applied seal element 110 tends to spread by a pressing process where the pair of substrates are attached. In particular, the accumulated seal element 110 tends to flow to the active area 120 from the seal portion along the connection line 530 where the gap between the couple of the substrates is smaller.

In the first embodiment, the array substrate 200 includes a block member 600 with a convex shape for blocking the flow of the accumulated seal element 110, which is provided between the active area 120 and seal portion 115. In the embodiment shown in FIG. 3, the block member 600 includes three block elements of a first block element 610, a second block element 620 and a third block element 630, arranged along the seal portion 115 in parallel with each other and crossing the connection line 530. The first block element 610 and the third block element 630 are arranged adjacent to the seal portion 115 and the active area 120, respectively. The second block element 620 is arranged between the first block element 610 and the third block element 630.

In the above embodiment, the block elements 610, 620 and 630 are formed of six layers of the connection line 530, the gate insulating layer 240, a first layer made of semiconductor material 601 and a second layer made of the same conductive material as the gate electrode, the passivation film 244 and the alignment layer 250 as shown in FIG. 4. The gap (G1) between the block elements (610, 620, 630) and the counter substrate 300 is smaller than that (G2) between the slits, which are formed between adjacent block elements (610, 620), (620, 630) in the array substrate 120, and the counter substrate 300. In the seal portion 115, the gap (G3) between the substrates 200 and 300 is larger than gap (G1) and approximately equal to the gap (G2). This is because four layers are stacked on the insulating substrate 210 at the seal portion 115 while the six layers are stacked on the insulating substrate 210 in the respective block element, in which the counter electrode 330 and an alignment layer 350 of the counter substrate 300 are formed on the insulating substrate 310 facing to the array substrate 200 with a flat surface throughout in the counter substrate.

According to the above construction, the seal element 110 applied to the seal portion 115 spreads toward the first block element 610 accelerated by the small gap (G1) between the first block element 610 and the counter substrate 300. Then, the spread seal element 110 slows down at the slit between the first block element 610 and the second block element 620 with a larger gap (G2). The second block element 620 works as a bank for blocking the flow of the seal element 110. Therefore the flown seal element 110 almost stops at the second block element 620. That is, the seal member 110 flowing along the connection line 530 from the seal portion 115 is spread to a lateral direction with reference to the connection line 530 by using a capillary action generated between the first block element 610 and the second block element 620. Accordingly, the spread of the seal element 110 beyond the second block element 620 is prevented. It is necessary to provide at least two block elements as the block member 600 between the seal portion 115 and the active area 120. In case that more than two block elements are provided, a more complete effect for suppressing the spread of the seal element 11 is obtained.

As described above, it becomes possible to prevent the seal element 110 from flowing into the active region 120 at the area where the power supply line 500 crosses the seal element 110 by suppressing the spread of the seal element 110, which can prevent the generation of a display defect. Accordingly, it becomes possible to obtain a high quality display and increased production yield.

The detailed construction of the above described block member 600 for blocking the flow of the seal element during the manufacturing process will be described below.

The block elements 610, 620 and 630 configuring the block member 600 include a main body portion with a line shape, respectively, so as to face to the power supply pad 510 interposing the sealing portion 115 therebetween. The first block element 610 includes a main body portion 611 that linearly extends in a direction crossing the row direction H and the column direction V at approximately 45 degrees, respectively. Similarly, the second block element 620 and the third block element 630 include main body portions 621 and 631 in parallel with the main body element 611 of the first block element 610. The main body portions are each arranged so as to orthogonally cross the flowing direction of the seal element 110. According to such construction, the spread of the flowing of the seal element 110 into the active area 120 is effectively prevented.

The first and the second block elements 610 and 620 arranged at the seal portion side have an approximate U-shaped configuration, respectively. The first block element 610 includes a first side portion 612 and a second side portion 613 connected to the main body portion 611 and extending in the row direction H and the column direction along the seal portion 115, respectively. Similarly, the second block element 620 includes a first side portion 622 and a second side portion 623 arranged in parallel with the first side portion 612 and the second side portion 613 of the first block element 610 and connected to the main body portion 621, respectively. In this embodiment, though the third block element 630 is constructed by only a main body portion 631 with a line shape, it can be formed with the same U-shape as the first and the second block elements 610 and 620 without being limited to being line shaped.

In the first and the second block elements 610 and 620, the length of the main body portion 611 (621) may be different from or equal to the side portions 612 and 613 (622, 623). Similarly, the first and second block elements 610 and 620 may be so designed that their shapes are the same and their dimensions are approximately the same.

It is preferable to set the length of the side portion 622 (623) of the second block element 620 larger than that of the side portion 612 (613) of the first block element 610 to suppress the spread of the seal element 110 more effectively though a certain effect can be obtained in case that the length of the side portion of the second block element 620 is smaller than that of the first block element 610.

According to above arrangement, it is possible to stop the spread of the seal element 110 by not only the main portions but the side portions of the block elements. Therefore even if excessive seal element is applied to the seal portion at the corner of the display array substrate 200, the flow of the seal element 110 into the active area 120 around the connection line 530 is prevented.

Each block member is made of the same materials as those used for manufacturing the array substrate 200. That is, the block member includes a first layer 601 made of the same semiconductor material as the semiconductor layer 242 on the gate insulating layer 240 and a second layer 602 made of the same material as source electrode on the first layer 601. The first layer 601 and the second layer 602 are formed when the switching transistor is made using same manufacturing process, that is, the process for patterning the semiconductor layer and the source electrode of the array substrate 200. Since a further process to form the block member 600 is not required, increase of the manufacturing cost can be avoided. Further, in the block member manufactured by the patterning of the stacked semiconductor layer and the metal layer, the block member 600 hardly has an undesirable taper shape while the block member 600 manufactured by the patterning of a resin material has a taper shape. Therefore it is possible to form the block member in a small area and suppress the spread of the seal element 110 without sacrificing the narrow frame.

The block elements are arranged so as to have a gap between the counter substrate 300 and the array substrate 200. That is, the block elements do not contact with the counter substrate 300. Therefore a path between the block member and the counter substrate 300, where the injected liquid crystal material passes, can be obtained and it becomes possible to suppress the spread of the seal element 110 without blocking the injection of the liquid crystal material.

A liquid crystal display device according to the second embodiment of the present invention will be described. The same components of the present embodiment as those of the above described first embodiment are denoted by the same reference numbers and will not be described below in detail.

Figure 5:
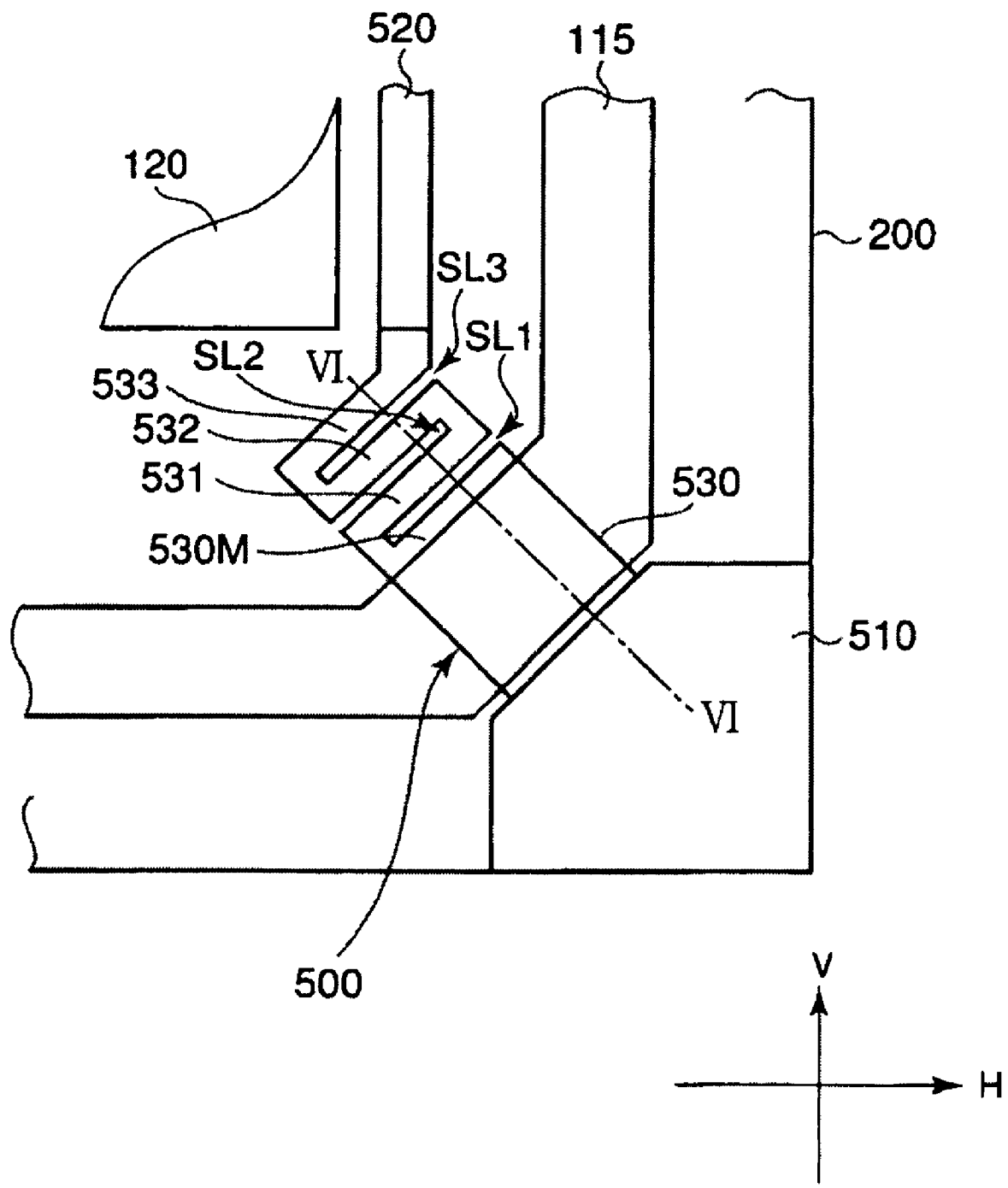
FIG. 5 is a diagram showing the constructions for a power supply and for suppressing a spread of a seal element according to a second embodiment of the invention.
Figure 6:
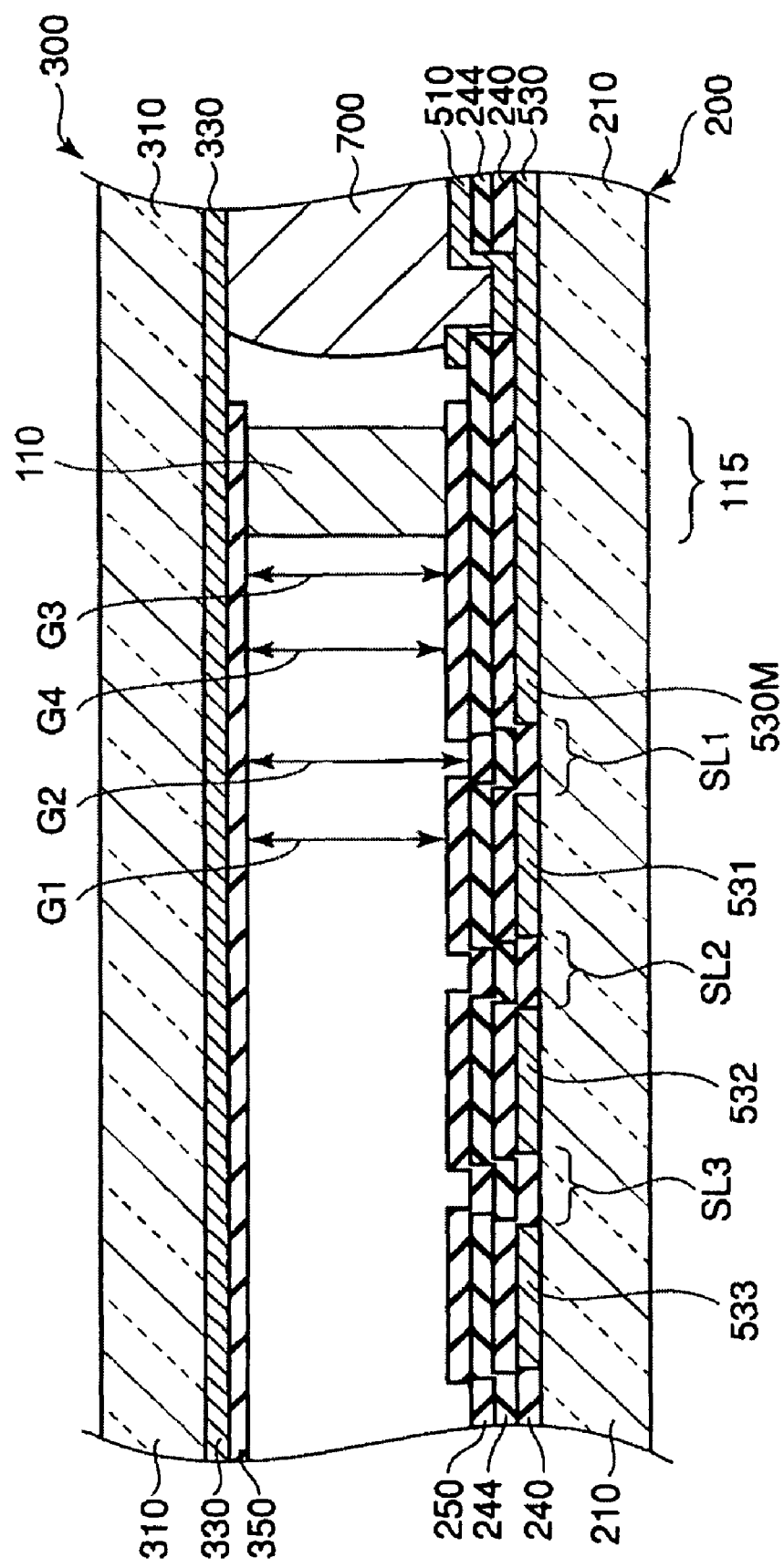
FIG. 6 is a cross-sectional view showing the construction of the liquid crystal display panel and the power supply portion shown in FIG. 5 taken along line VI-VI.

As shown in FIGS. 5 and 6, the array substrate 200 includes a power supply line 500 constructed by a power supply pad 510, a common line 520 and a connection line 530. Especially, in this second embodiment, the connection line 530 is formed in a serpentine shape, in which a plurality of line portions are arranged in parallel each other. That is, the connection line 530 connects the power supply pad 510 with the common line 520 crossing the seal portion 115. The connection line 530 linearly extends from the power supply pad 510 to the active area 200 crossing the seal portion 115. In this embodiment, the connection line 530 includes three line portions 531, 532 and 533 between the seal portion 115 and the active area 120. The connection line 530 includes the first line portion 531 curved from the middle portion 530M approximately in parallel with the seal portion 115, a second line portion 532 extending in parallel with the seal portion 115 making a U turn from the first line portion 531 and a third line portion 533 in parallel with the seal portion 115 making a U turn from the second line portion 532e. The first, second and third line portions are in parallel each other. The third line portion 533 is connected to the common line 520 or formed integrally with the common line 520.

In other words, a plurality of hollow ground grooves is formed in the connection line 530 between the seal portion 115 and the active area 120. In this embodiment, the grooves form three slits in parallel with the seal portion 115 facing to the power supply pad 510. A first slit SL1 is formed between the middle portion 530M and the first line portion 531 of the connection line 530 and a second slit SL2 is formed between the first line portion 531 and the second line portion 532. Further, a third slit SL3 is formed between the second line portion 532 and the third line portion 533. The first slit SL1 and the third slit SL3 are formed in the same direction while the second slit SL2 is formed in the opposite direction relative to the first and third slits SL1 and SL3.

According to the second embodiment, as shown in FIG. 6, the gap between the line portions and the counter substrate 300 is reduced relative to the gap between the slits of the array substrate 200 and the counter substrate 300. That is, since the thickness of the counter substrate 300 is approximately the same throughout, the gap G1 between the line portions 531, 532 and 533 and the counter substrate 300 is smaller than the gap G2 between the slits (SL1, SL2, SL3) and the counter substrate 300. The gap G3 between the seal portion 115 of the array substrate 200 and the counter substrate 300 and the gap G4 between the middle line portion 530M of the array substrate 200 and the counter substrate 300 are smaller than the gap G2 and approximately the same as the gap G1.

According to the above construction, the spread speed of the flown out seal element 110 formed on the seal portion 115 decreases at the gap G2 where the first slit SL1 between the middle portion 530M and the first line portion 531 faces the counter substrate 300. The first line portion 531 functions to block the spread of the seal element 110. Therefore the flown seal element 110 almost stops at the first line portion 531. Though the seal element 110 may be spread on the connection line 530, it becomes possible to reduce the spread strength because the connection line 530 snakes the way with a longer path.

According to the second embodiment, it is possible to make shorter the distance between the active area 120 and the power supply pad 510 than in the first embodiment in which the block members are provided between the seal portion 115 and the active element 120. That is, the second embodiment may be applicable to such construction where otherwise enough space to form the block members can not be obtained due to the request for narrow frame.

More detailed constructions of the line portions and the slits of the connection line 530 will be described below.

The line portions 531, 532 and 533, and slits SL1, SL2 and SL3 linearly extend in a direction crossing the row direction H and a column direction V at approximately 45 degrees, respectively. The line portions and the slits are each arranged so as to orthogonally cross the flowing direction of the seal element 110. According to such construction, the spread of the flowing of the seal element 110 into the active area 120 is effectively prevented.

A liquid crystal display device according to a third embodiment of the present invention will be described. The same components of the present embodiment as those of the above described first embodiment are denoted by the same reference numbers and will not be described below in detail.

Figure 7:
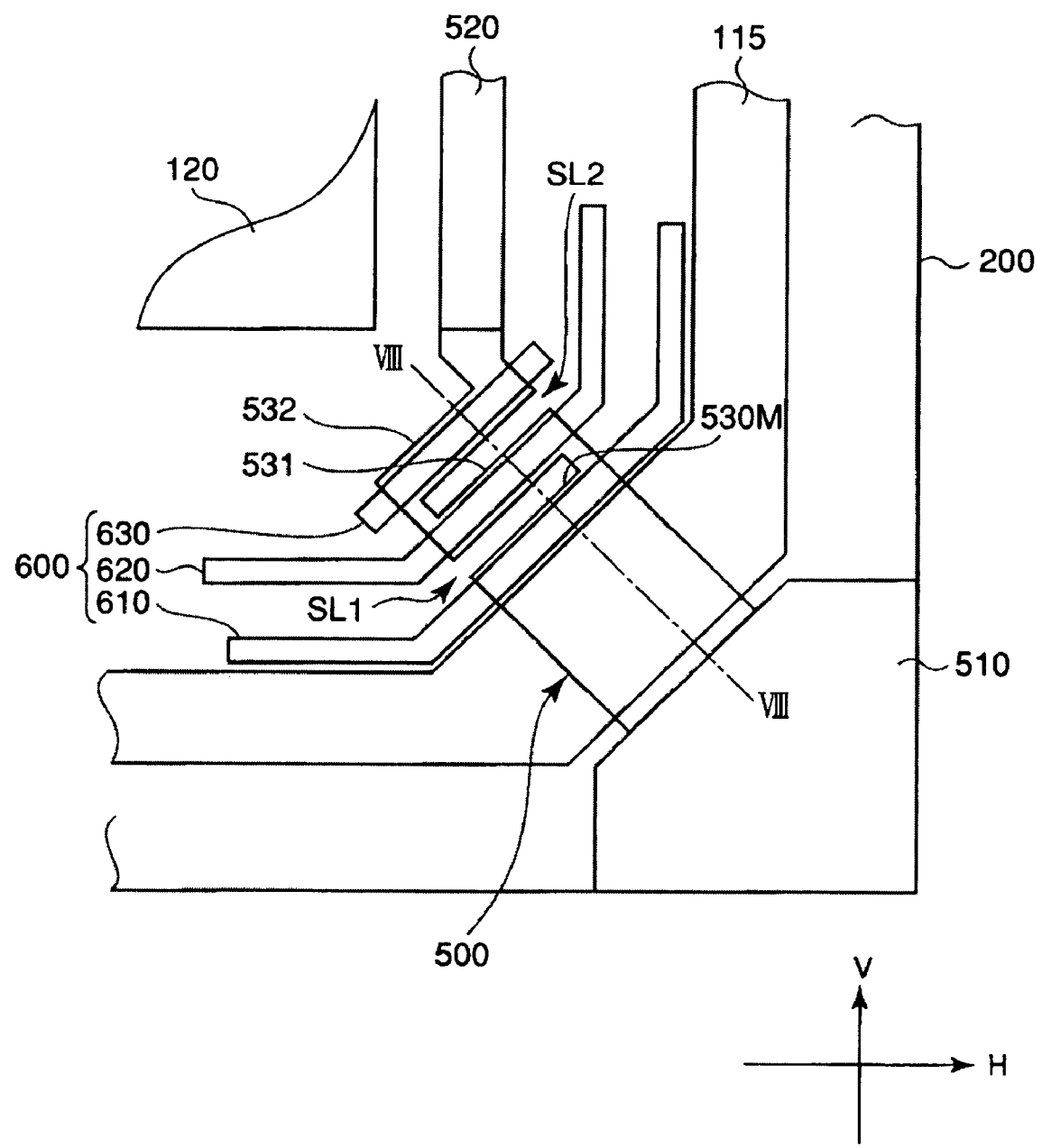
FIG. 7 is a diagram showing the construction for a power supply and for suppressing a spread of a seal element according to a third embodiment of the invention.
Figure 8:
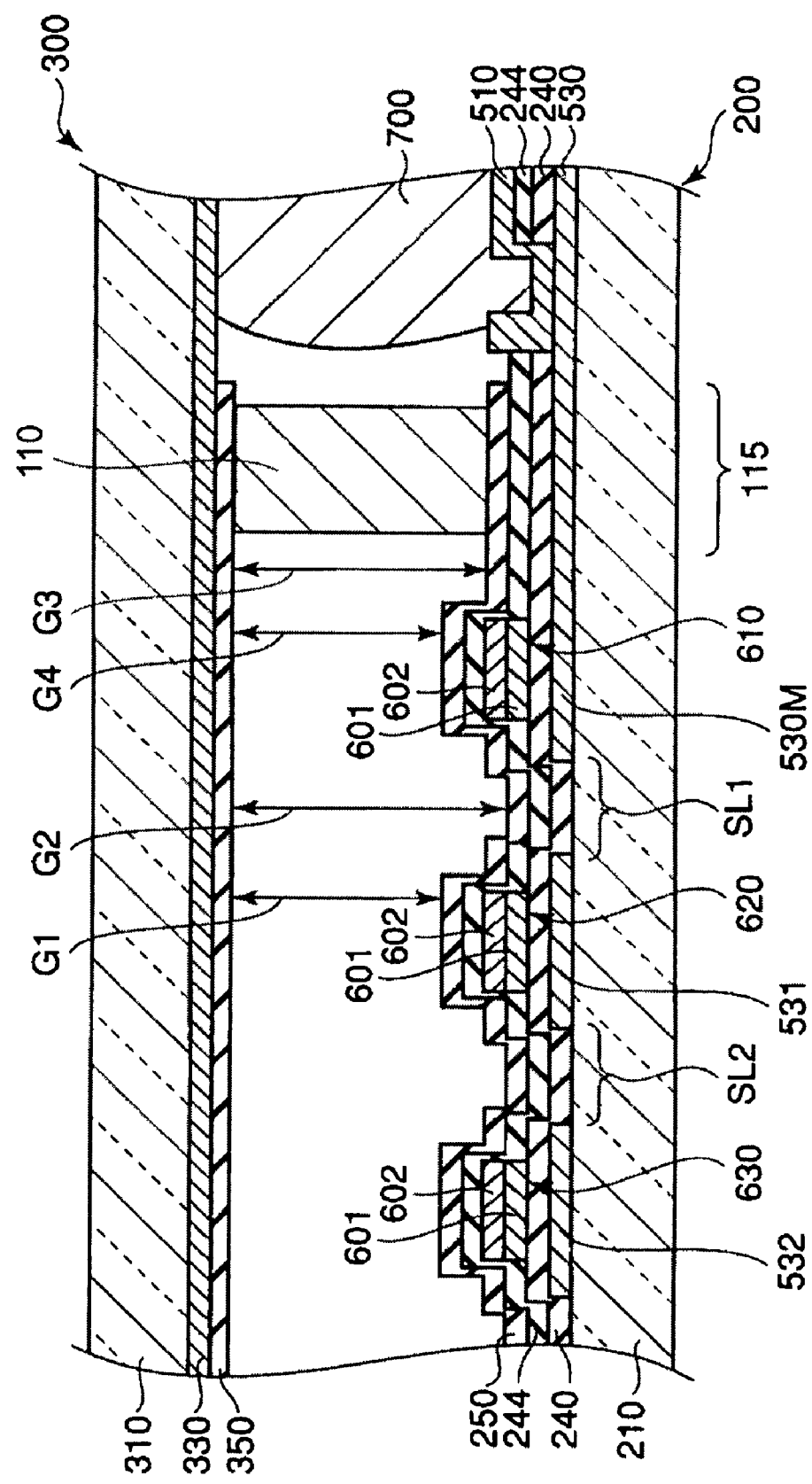
FIG. 8 is a cross-sectional view showing the construction of the liquid crystal display panel and a power supply portion shown in FIG. 7 taken along line VIII-VIII.

As shown in FIGS. 7 and 8, the array substrate 200 includes a power supply line 500 constructed by a power supply pad 510, a common line 520 and a connection line 530. In this third embodiment, the connection line 530 is formed in a serpentine shape, in which a plurality of line portions are arranged in parallel with each other between the active area 120 and the seal portion 115 as in the second embodiment. That is, the connection line 530 connects the power supply pad 510 with the common line 520 crossing the seal portion 115. The connection line 530 linearly extends from the power supply pad 510 to the active area 120 crossing the seal portion 115.

In this embodiment, the connection line 530 includes two line portions 531 and 532 between the seal portion 115 and the active area 120. The connection line 530 includes the first line portion 531 connected a middle portion 530M and curved from the middle portion 530M approximately in parallel with the seal portion 115 and a second line portion 532 extending in parallel with the seal portion 115 making a U turn from the first line portion 531. The first and the second line portions are in parallel with each other. The second line portion 532 is connected to the common line 520 or formed integrally with the common line 520. A first slit SL1 is formed between the middle portion 530M and the first line portion 531 of the connection line 530 and a second slit SL2 is formed between the first line portion 531 and the second line portion 532. The first slit SL1 is formed in the opposite direction with respect to the second slit SL2.

In this third embodiment, the array substrate 200 further includes a block member 600 with a convex shape formed on the line portions and the middle portion of the connection line 530. The block member 600 includes a first block element 610 arranged on the middle portion 530M adjacent to the seal portion 115, a second block element 620 formed on the first line portion 531 and a third block element 630 formed on the second line portion 532 adjacent to the active area 200.

According to the third embodiment, the gap between the line portions and the counter substrate 300 is reduced relative to the gap between the slits of the array substrate 200 and the counter substrate 300 by the connection line 530 with a snake like shape and the block members arranged on the line portions of the connection line 530. That is, since the thickness of the counter substrate 300 is nearly equal throughout, the gap (G1) between the line portions 531, 532 and the counter substrate 300 is smaller than the gap (G2) between the slits (SL1, SL2) and the counter substrate 300 as shown in FIG. 8. The gap (G4) between the middle portion 530M of the array substrate 200 and the counter substrate 300 is smaller than the gap (G2) and nearly equal to the gap (G1). In the seal portion 115, the gap (G3) between the array substrate 200 and the counter substrate 300 is smaller than the gap (G2) and larger than the gaps (G1) and (G4).

The construction of the block member 600 in this embodiment is described in the first embodiment. Similarly, the construction of the connection line 530 with the serpentine shape is described in the second embodiment.

According to this embodiment, the respective advantages of the first embodiment and the second embodiment are obtained.

A liquid crystal display device according to a fourth embodiment of the present invention will be described below. The same components of the fourth embodiment as those of the above described first embodiment are denoted by the same reference numbers and will not be described below in detail.

Figure 9:
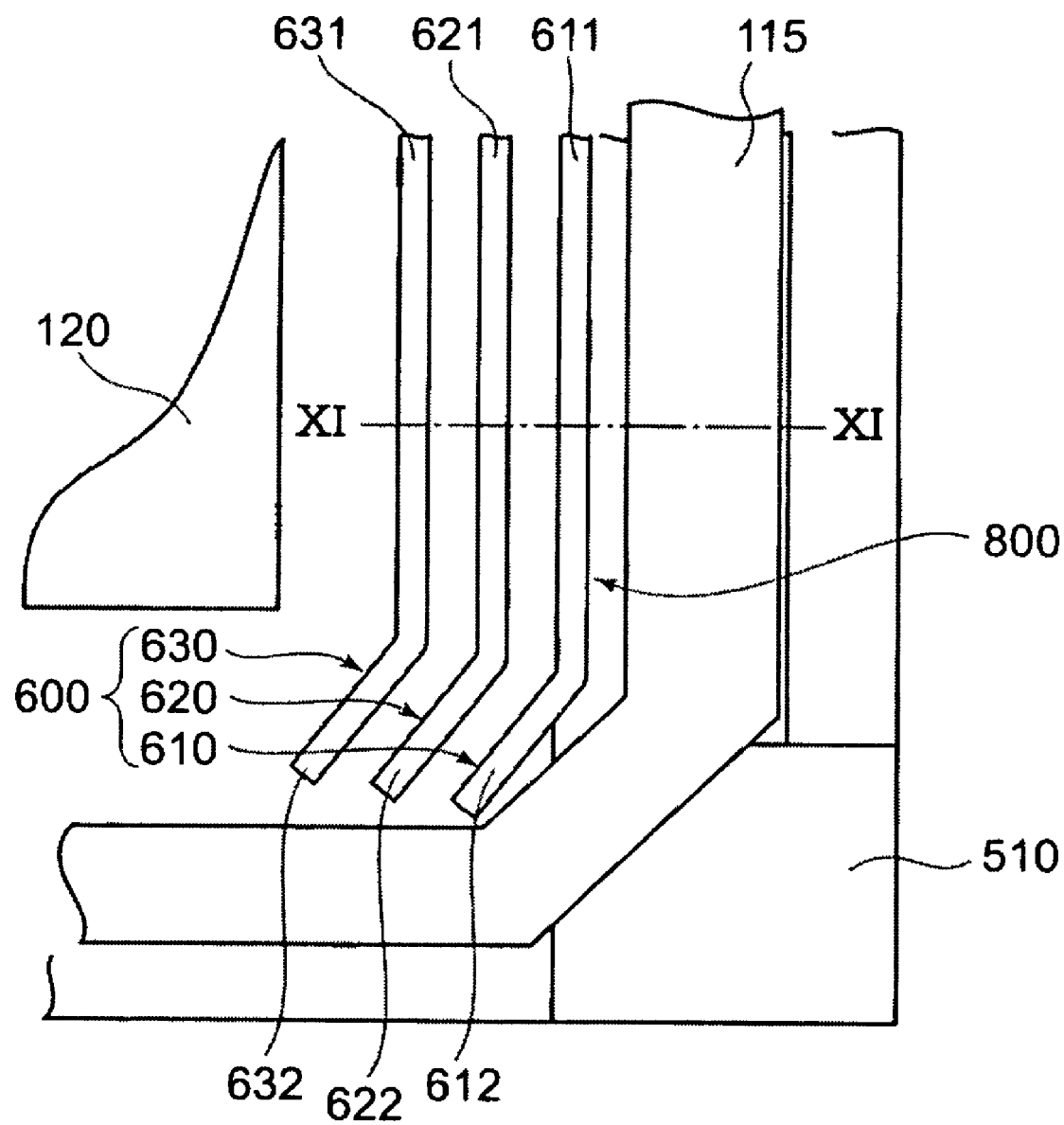
FIG. 9 is a diagram showing the construction for a power supply and for suppressing a spread of a seal element according to a fourth embodiment of the invention.

As shown in FIGS. 9 and 10, a seal element 110 is disposed at the seal portion 115 on a power supply line 800 which is connected to the power supply pad 510 so as to surround the active area 120. A block member 600 including three block elements 610, 620 and 630 with a convex shape is arranged between the active region 120 and the seal element 115 along the power supply line 800 and the seal portion 115. The first block element 610 is arranged on the power supply line 800 while the second and the third block elements 620 and 630 are arranged outside the power supply line 800 between the power supply line 800 and the active area 120. The third block element 630 is adjacent to the active area 120.

The first block element 610 having a main portion 611 and a side portion 612 is formed on the power supply line 800 along the seal portion 115. The side portion 612 of the first block element 610 is arranged so as to face the power supply pad 510. Similarly, the second and the third block elements include main portions 621 and 631 and side portions 622 and 632, respectively. The construction of the block elements 610, 620 and 630 according to this embodiment is described in the first embodiment. A first slit SL1 is formed between the first block element 610 and the second block element 620. Similarly, a second slit SL2 is formed between the second block element 620 and the third block element 630. The gap (G1) between the second block element 620 and the counter substrate 300 is smaller than the gap (G2) between the slit SL1 and the counter substrate 300. The gap (G3) between the seal portion 115 and the counter substrate 300 is larger than the gap (G2) and smaller than the gap (G4) between the first block element 610 and the counter substrate 300.

According to this invention, a liquid crystal display device having a narrower frame in which the seal element is arranged on the power supply line can be obtained without a display defect caused by the spread of the seal element.

According to this invention, the spread of the seal material from the seal portion formed on the power supply line is suppressed by providing a block member between the seal portion 115 and the active area 120. Therefore it is possible to suppress the display defect due to the incomplete seal and obtain a high quality display and a high production yield.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

The invention claimed is:

1. A liquid crystal display device comprising:
   a liquid crystal display panel having an active area for displaying pictures, the active area having pixels arranged in a matrix shape;
   a first substrate including picture electrodes of the pixels;
   a second substrate having a common electrode facing the picture electrodes;
   a seal element arranged in a seal portion surrounding the active area so as to attach the first substrate and the second substrate; and
   a liquid crystal layer held between the couple of substrates,
   wherein the first substrate further comprises a power supply pad arranged at a corner of the active area facing to the common electrode, a common line arranged between the active area and the seal portion for supplying a common voltage, a connection line for connecting the power supply pad to the common line crossing the seal portion, a block member of a convex shape having first and second block elements forming a slit and arranged opposite to the seal element between the active area and the seal portion crossing the connection line, and
   wherein a gap between the first and the second block elements and the second substrate is smaller than a gap between the slit formed by the first and second block elements and the second substrate on the connection line.

2. The liquid crystal display device according to claim 1, wherein a gap between the seal portion and the second substrate is nearly equal to a gap between the slit formed by the first and second block elements and the second substrate and larger than the gap between the slit formed by the first and the second block elements and the second substrate on the connection line.

3. The liquid crystal display device according to claim 1, wherein the first and the second block elements each include a main portion with a line shape which faces the power supply pad.

4. The liquid crystal display device according to claim 3, wherein the first block element adjacent to the seal portion further comprises a first side portion extending in the column direction along the seal element and a second side portion extending in the row direction along the seal element, each connected to the main portion, respectively.

5. The liquid crystal display device according to claim 4, wherein the length of the main portion of the first block element is larger than that of the side portions.

6. The liquid crystal display device according to claim 5, wherein the second block element adjacent to the active area further comprises a first side portion extending in the column direction along the seal element and a second side portion extending in the row direction along the seal element, each connected to the main portion.

7. The liquid crystal display device according to claim 1, wherein the shape of the first and the second block elements are same.

8. The liquid crystal display device according to claim 1, wherein the active area further comprises:
   a gate line extending to the row direction;
   a source line extending to the column direction; and
   a switching transistor having semiconductor material for each pixel,
   wherein the connection line is formed of the same material as the gate line, and the block elements include a first layer made of the same material as the semiconductor material and a second layer made of the same material as the source line being stacked on the first layer.

9. A liquid crystal display device comprising:
   a liquid crystal display panel having an active area for displaying pictures, the active area having pixels arranged in matrix shape;
   a first substrate including picture electrodes of the pixels;
   a second substrate having a common electrode facing the picture electrodes;
   a seal element arranged in a seal portion so as to surround the active area and so as to attach the first substrate to the second substrate; and
   a liquid crystal layer held between the first and second substrates,
   wherein the first substrate further comprises a power supply pad arranged at a corner of the active area facing to the common electrode, a common line, arranged between the active area and the seal portion for supplying a common voltage, and a connection line for connecting the power supply pad to the common line crossing to the seal portion, and wherein the connection line has a serpentine shape including a plurality of line portions arranged in parallel with each other, and a gap between the line portions and the second substrate is smaller than a gap between a slit formed by adjacent of the line portions and the second substrate on the connection line.

10. The liquid crystal display device according to claim 9, wherein the active area further comprises:
a gate line extending in the row direction;
a source line extending in the column direction; and
a switching transistor having semiconductor material for each pixel,
wherein the connection line is formed of the same material as the gate line, and a double layer of a first layer made of the same material as the semiconductor material and a second layer made of a passivation film stacked on the line portions of the serpentine shaped connection line.

11. A liquid crystal display device comprising:
a liquid crystal display panel having an active area for displaying pictures, the active area having pixels arranged in matrix shape;
a first substrate including picture electrodes of the pixels;
a second substrate having a common electrode facing the picture electrodes;
a seal element arranged in a seal portion so as to surround the active area and so as to attach the first substrate to the second substrate; and
a liquid crystal layer held between the first and second substrates,
wherein the first substrate further comprises a power supply pad arranged at a corner of the active area facing the common electrode, a common line arranged between the active area and the seal portion, for supplying a common voltage and a connection line for connecting the power supply pad to the common line crossing the seal portion,
wherein the connection line has a serpentine shape having a plurality of line portions arranged in parallel with each other,
wherein a block member with a convex shape is formed on each line portion of the connection line.

12. The liquid crystal display device according to claim 11, wherein the active area further comprises:
a gate line extending to the row direction;
a source line extending to the column direction, and
a switching transistor having semiconductor material for each pixel,
wherein the connection line is formed of the same material as the gate line, and the block member includes a first layer made of the same material as the semiconductor material and a second layer made of the same material as the source line stacked on the first layer.

13. The liquid crystal display device according to claim 12, wherein the block member includes a main portion with a line shape which faces to the power supply pad, a first side portion extending in the column direction along the seal element, and a second side portion extending in the row direction along the seal element, each connected to the main portion.

14. The liquid crystal display device according to claim 13, wherein the length of the main portion of the block member is larger than that of the side portions.

15. A liquid crystal display device comprising:
a liquid crystal display panel having an active area for displaying pictures, the active area having pixels arranged in matrix shape;
a first substrate including picture electrodes of the pixels;
a second substrate having a common electrode facing the picture electrodes;
a seal element arranged in a seal portion so as to surround the active area and so as to attach the first substrate to the second substrate; and
a liquid crystal layer held between the first and second substrates,
wherein the first substrate further comprises a power supply pad arranged at a corner of the first substrate facing the common electrode, and a power supply line formed at a peripheral portion of the first substrate facing the active area,
wherein the seal element is formed at a seal portion on the power supply line, and a block member having first and second block elements arranged in parallel with the seal portion is formed between the active area and the seal portion, and
wherein the first block element is formed on the power supply line along the seal portion and a slit is formed between the first block element and the second block element adjacent to the active area, in which a gap between the first block element and the second substrate is smaller than a gap between the slit and the second substrate.

16. The liquid crystal display device according to claim 15, wherein a gap between the second block element and the second substrate is smaller than the gap between the slit formed by the first and the second block elements and the second substrate and larger than the gap between the first block element and the second substrate.

17. The liquid crystal display device according to claim 15, wherein the first and the second block elements include a main portion with a line shape along the seal element and a side portion connected to the main portion, in which the side portion faces the power supply pad.

18. The liquid crystal display device according to claim 17, wherein the shape of the first and the second block elements are approximately the same.

19. The liquid crystal display device according to claim 15, wherein the active area further comprises:
a gate line extending to a row direction; a source line extending to a column direction; and a switching transistor having semiconductor material for each pixel,
wherein the first and the second block elements include a first layer made of the same material as the semiconductor material and a second layer made of the same material as the source line, each being stacked on the first layer.

* * * * *